(12) United States Patent
Barbuck

(10) Patent No.: US 10,212,970 B2
(45) Date of Patent: Feb. 26, 2019

(54) VAPORIZER ADAPTER FOR A ROLLED ARTICLE

(71) Applicant: Elise Barbuck, Bethpage, NY (US)

(72) Inventor: Elise Barbuck, Bethpage, NY (US)

(*) Notice: Subject to any disclaimer, the term of this patent is extended or adjusted under 35 U.S.C. 154(b) by 0 days.

(21) Appl. No.: 15/467,287

(22) Filed: Mar. 23, 2017

(65) Prior Publication Data

US 2017/0273357 A1   Sep. 28, 2017

Related U.S. Application Data

(60) Provisional application No. 62/312,401, filed on Mar. 23, 2016.

(51) Int. Cl.
| | |
|---|---|
| *A24F 13/00* | (2006.01) |
| *A24F 17/00* | (2006.01) |
| *A24F 25/00* | (2006.01) |
| *A24F 47/00* | (2006.01) |
| *H02J 7/00* | (2006.01) |
| *H05B 1/02* | (2006.01) |
| *H05B 3/04* | (2006.01) |
| *H05B 3/44* | (2006.01) |

(52) U.S. Cl.
CPC .......... *A24F 47/008* (2013.01); *H02J 7/0052* (2013.01); *H05B 1/0244* (2013.01); *H05B 3/04* (2013.01); *H05B 3/44* (2013.01); *H02J 2007/0062* (2013.01); *H05B 2203/014* (2013.01); *H05B 2203/021* (2013.01); *H05B 2203/022* (2013.01)

(58) Field of Classification Search
USPC .................................................. 131/329, 328
See application file for complete search history.

(56) References Cited

U.S. PATENT DOCUMENTS

| | | | | |
|---|---|---|---|---|
| 987,823 | A * | 3/1911 | Perry ........................ | A24F 1/00 131/184.1 |
| 1,024,980 | A * | 4/1912 | Fernandez ............... | A24F 13/10 131/182 |
| 2,104,266 | A * | 1/1938 | McCormick .......... | A24F 47/008 131/175 |
| 3,757,803 | A * | 9/1973 | Chiang ................... | A24F 13/06 131/188 |
| 4,848,376 | A * | 7/1989 | Lilja ...................... | A24B 15/18 131/352 |
| 5,472,001 | A * | 12/1995 | Nicholson ............... | A24F 13/00 131/185 |
| 7,530,357 | B2 * | 5/2009 | Edwards, Jr. .......... | A24F 13/16 131/175 |

(Continued)

*Primary Examiner* — Abdullah Riyami
*Assistant Examiner* — Thang Nguyen
(74) *Attorney, Agent, or Firm* — Wilson Dutra, PLLC; Camille A. Wilson

(57) ABSTRACT

The present disclosure relates to methods and apparatus for vaporizing the plant material of a rolled article. More specifically, the present disclosure presents an apparatus for adapting a rolled article to be inhaled through a vaporization of the active ingredient of the plant material contained within the rolled article. The present disclosure relates to a device battery powered heating element, a means to insert or attach to a cigarette or other rolled article, such as a cigar or other roll of tobacco, marijuana, or smoking substance, and a means to activate the heating element, wherein the heating element may vaporize the rolled material for inhalation.

17 Claims, 5 Drawing Sheets

(56) References Cited

U.S. PATENT DOCUMENTS

| | | | | |
|---|---|---|---|---|
| 9,364,023 B1* | 6/2016 | Nicholson | ............... | A24F 13/06 |
| 2013/0146075 A1* | 6/2013 | Poget | ................... | A24B 15/165 |
| | | | | 131/329 |
| 2017/0150756 A1* | 6/2017 | Rexroad | ............... | A24F 47/008 |

* cited by examiner

VAPORIZER ADAPTER FOR A ROLLED ARTICLE

CROSS-REFERENCE TO RELATED APPLICATION

This application claims priority to and the full benefit of U.S. Provisional Patent Application Ser. No. 62/312,401 (filed Mar. 23, 2016, and titled "VAPORIZER ADAPTER FOR A ROLLED ARTICLE"), the entire contents of which are incorporated herein by reference.

BACKGROUND OF THE DISCLOSURE

When cigarettes were first introduced into society, the negative effects of second-hand smoke were not widely known. In those early days, people were allowed to smoke anywhere and everywhere. Planes, trains, and restaurants allowed smoking in almost every area. As time went on, however, and as health experts determined how second-hand smoke affected people, public awareness shifted on its permissiveness on smoking in closed areas.

As a result, there has been a growing trend toward vaporizers, such as electronic cigarettes or tabletop vaporizers. Electronic cigarettes were developed as an alternative to the traditional model of smoking cigarettes, with an aim to lessen or eliminate the effects of carcinogens produced by the smoke exhaled through traditional cigarettes. Electronic cigarettes were also developed to deliver nicotine to its users without odor or smoke. This was partially necessitated by the side effects of second-hand smoke, though this was also a result of the ongoing promulgation of non-smoking sections in public areas.

At a basic level, a vaporizer heats contents to a high enough temperature to produce a desired effect, such as releasing the desired components within oils or extracts, but not enough to make the substances burn. Vaporizers avoid tobacco combustion and, as such, the vapor produced is less likely to irritate either the user or people around the user. This vapor is more akin to steam produced in a shower than the thick smoke typically produced by a traditional cigarette. However, people who smoke currently lack an option that produces the feel of traditional cigarettes while providing the benefits of an electronic cigarette or vaporizer.

SUMMARY OF THE DISCLOSURE

What is needed, therefore, is a device that combines the best of both worlds, namely the feel of a traditional cigarette with the benefits of a vaporizer or electronic cigarette. Accordingly, the present disclosure relates to an adapter that may convert traditional rolled articles, such as, but not limited to, cones, cigarettes, or cigars, into handheld vaporizers.

The present disclosure relates to methods and apparatus for vaporizing the plant material of a rolled article. More specifically, the present disclosure presents an apparatus for adapting a rolled article to be inhaled through a vaporization of the active ingredient of the plant material contained within the rolled article.

The present disclosure relates to a device battery powered heating element, a means to insert or attach to a cigarette or other rolled article, such as a cigar or other roll of tobacco, marijuana, or smoking substance, and a means by which to activate the heating element to vaporize the rolled material for inhalation. In some aspects, the present disclosure relates to an adapter that may adapt a traditional rolled article to be inhaled similarly to an electronic cigarette, while permitting a user to vape in a manner similar to the traditional action of smoking a cigarette or other rolled article.

The present disclosure relates to a vaporizer adapter that may comprise a rolled article housing element and a heating mechanism extending into the rolled article housing element, where the heating mechanism is configured to vaporize the plant composition. The rolled article housing element may comprise a receiving end configured to receive a rolled article that may comprise a plant composition, where a vaporization of the plant composition releases an inhalable active ingredient; a containing portion configured to at least partially contain inhalable active ingredients vaporized from the rolled article, and a releasing end, where the inhalable active ingredients are released.

In some aspects, the vaporizer adapter further may comprise: a power source; and a controller in logical communication with the power source and the heating mechanism, where the controller transmits operational commands to the heating mechanism. In some aspects, the power source may be removable. In some embodiments, the power source may rechargeable. The vaporizer adapter further may comprise a charging port configured to receive a charging source, where the charging source recharges the power source when detachably connected to the charging port, such as a micro-universal serial bus ("USB") port.

The vaporizer adapter further may comprise a trigger mechanism in logical communication with the controller, where the trigger mechanism is configured to receive user control inputs. The trigger mechanism may be located proximate to the releasing end. The trigger mechanism may be located distally to the releasing end.

The vaporizer adapter further may comprise a sensor configured to sense a predefined parameter, where the sensor is in logical communication with one or more the trigger mechanism, controller, or power source. In some aspects, the sensor may be located proximate to the releasing end. In some embodiments, the sensor may be configured to detect a proximity of a human mouth, where detection prompts a predefined action related to the heating mechanism.

In some implementations, the vaporizer adapter may be reusable. The receiving end and the releasing end may comprise the same end. The receiving end may be distal to the releasing end. In some aspects, at least a portion of the heating mechanism may be placed in contact with at least a portion of the plant composition of the rolled article when the rolled article is received.

In some aspects, the heating mechanism may comprise a heating coil and a protective barrier that limits combustion of the plant composition. The heating mechanism may be configured to heat the plant composition to a predefined temperature. The predefined temperature may be variable based on a type of plant composition. The vaporizer adapter further may comprise a release guard proximate to the releasing end, where the release guard is configured to limit escape of the inhalable active ingredient.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure.

DETAILED DESCRIPTION

The present disclosure relates to methods and apparatus for vaporizing the plant material or plant-derived material of a rolled article. More specifically, the present disclosure presents an apparatus for adapting a rolled article to be inhaled through a vaporization of the active ingredient of the plant material or plant-derived material contained within the rolled article.

In the following sections, detailed descriptions of examples and methods of the disclosure will be given. The description of both preferred and alternative examples are exemplary only, and it is understood that variations, modifications, and alterations may be apparent to those skilled in the art. It is therefore to be understood that the examples do not limit the broadness of the aspects of the underlying disclosure as defined by the claims.

Glossary

Rolled Article: as used herein refers to any rolled article intended for smoking.

Plant Material: as used herein refers to plant material, plant-derived material, or any material wherein the heating may cause the release of an active ingredient in an inhalable form.

Vaporize: as used herein refers to the heating of a plant material or planted-derived liquid, wherein the heating causes the release of active ingredients in an inhalable form. As used herein, vaporization avoids or limits combustion of the plant material.

Figure 1:
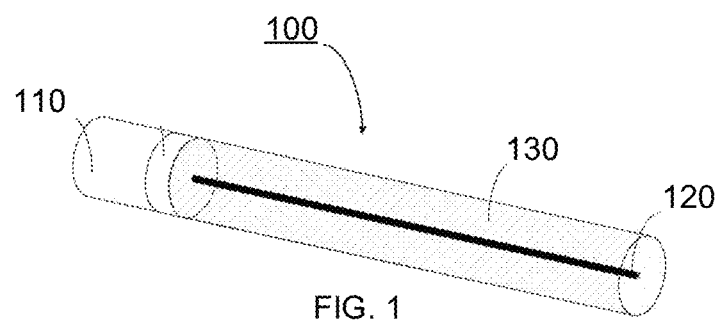
FIG. 1 illustrates an exemplary embodiment of a vaporizer adapter for a rolled article.

Referring now to FIG. 1, an exemplary embodiment of a vaporizer adapter 100 for a rolled article is illustrated. In some aspects, a vaporizer adapter 100 may comprise a power source 110, a heating element 120, and a housing element 130. The power source 110 may comprise a battery, which may be replaceable, rechargeable, or a combination thereof. The housing element 130 may comprise a containing portion that may comprise a non-porous material that may limit escape of the inhalable active ingredients. In some embodiments, the housing element 130 may comprise a double wall, which may reduce the external temperature of the housing element 130 allowing a user to safely touch the housing element 130 with limited risk of a burn. In some implementations, one or both the exterior or interior of the housing element 130 may be coated or lined with a thermal material limiting heat transfer.

In some aspects, the housing element 130 may comprise an opaque material, which may limit visibility of an inserted rolled article. The opaque material may comprise a decorative color or pattern, for example, to mimic the appearance of a rolled article. In other implementations, the housing element 130 may comprise a transparent material, which may allow visibility of an inserted rolled article. In some embodiments, the vaporizer adapter 100 may further comprise a lighting mechanism (not shown) that may illuminate the housing element 130. The illumination may be purely aesthetic or may indicate a status of the vaporizer adapter, such as, for example, in use, heating, inhalable, or depletion of active ingredients.

Figure 2:
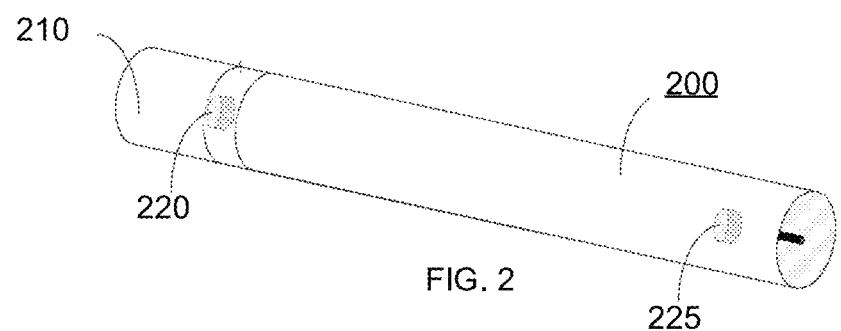
FIG. 2 illustrates an alternate exemplary embodiment of a vaporizer adapter for a rolled article.

Referring now to FIG. 2, an exemplary embodiment of a vaporizer adapter 200 for a rolled article is illustrated, wherein the vaporizer adapter 200 may comprise multiple activation mechanisms 220, 225. In some aspects, the vaporization may be activated by engaging an activation mechanism 220, 225. In some embodiments, a side activation mechanism 225 may be located where a user may naturally hold the vaporizer adapter 200, which may be held similarly to a traditional rolled article. In some implementations, an end activation mechanism 220 may control the power source 210, turning the vaporizer adapter on and off, and the side activation mechanism 225 may comprise the fine tuning controller, such as a heat boost to trigger additional release of the active ingredients.

In some embodiments, the trigger may heat the internal contents until deactivated by the user. In other embodiments, one trigger 220 may activate while the other trigger 225 deactivates, either through a mechanism (not shown) that returns the trigger 220 to its original state or by causing the trigger 220 to stop activating the heating element. In some embodiments, the trigger 220 may be timed and automatically shut off when it reaches a particular heat level or when the active ingredient is released, among other settings that may be activated or set by the user or detected by the vaporizer adapter 200. In some embodiments, one trigger 220, 225 may be used for a particular active ingredient, such as nicotine, while the other trigger 220, 225 not programmed may be used to regulate, such as to activate or deactivate these settings. In some embodiments, one trigger 220, 225 may include a sensor that activates the heating element when an ingredient is inserted and detected. This functionality may be activated and set independently by the user and is further described at FIG. 8 below.

Figure 3A:
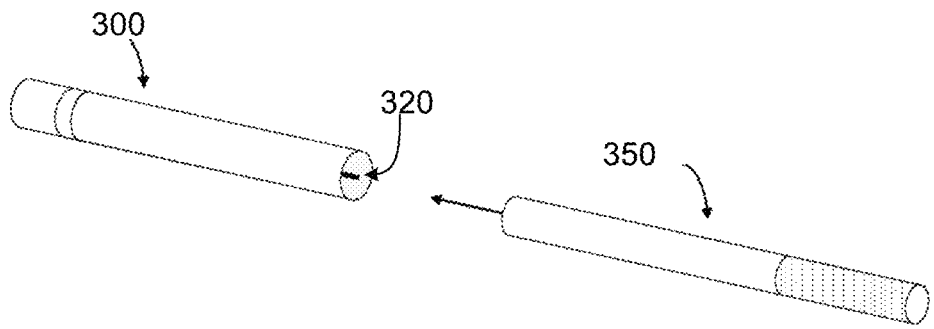
FIG. 3A illustrates an exemplary method step of use of a vaporizer adapter with a rolled article.
Figure 3B:
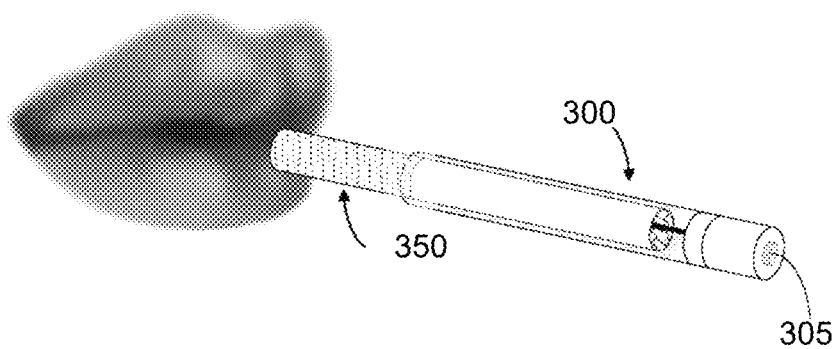
FIG. 3B illustrates an exemplary method step of use of a vaporizer adapter with a rolled article.

Referring now to FIGS. 3A-3B, an exemplary method of use of a vaporizer adapter 300 with a rolled article 350. In some embodiments, the heating element 320 may be inserted through the center of the rolled article 350, wherein the heating element 320 may be placed in proximity to the plant material within the rolled article 350. The proximity may allow the heating element 320 to slowly heat the plant material within the rolled article 350, wherein the heating may cause the plant material to release an active ingredient, such as nicotine. In some aspects, the vaporizer adapter 300 may comprise a trigger 305.

Figure 4:
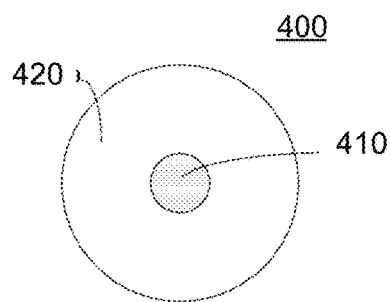
FIG. 4 illustrates a view from the powered end of an exemplary vaporizer adapter.

Referring now to FIG. 4, a view from the powered end of an exemplary vaporizer adapter 400 is illustrated. In some aspects, the vaporizer adapter 400 may comprise electronic housing 420 and an end activation button 410, which may activate the vaporization, such as described in FIG. 2.

Figure 5:
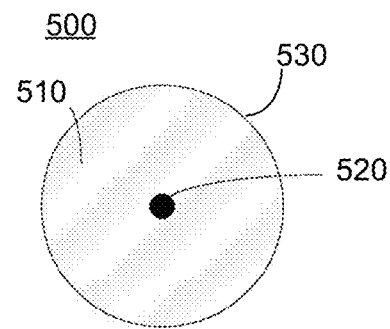
FIG. 5 illustrates a view from the receiving end of an exemplary vaporizer adapter.

Referring now to FIG. 5, a view from the receiving end of an exemplary vaporizer adapter 500 is illustrated. In some embodiments, the vaporizer adapter 500 may comprise a housing element 530 that may accept a rolled article into the interior 510, wherein acceptance of the rolled article may extend the heating element 520 through the center of the rolled article. A central location of the heating element 520 may allow the heating to effectively emanate through the plant material vaporizing the active ingredients without causing combustion. In some aspects, the heating element 520 may comprise an outer housing, which may prevent direct contact between the heat source and the plant material, further limiting the ability for combustion.

Figure 6:
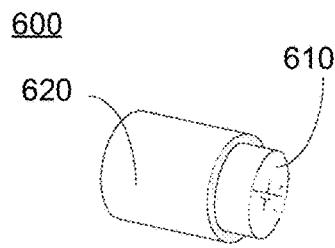
FIG. 6 illustrates a sectional view of the battery housing portion of the cigarette vaporizer, including the battery contained within the battery housing.

Referring now to FIG. 6, a sectional view of an exemplary power source housing 620 with power source 610 of a vaporizer adapter 600 is illustrated. In some aspects, the power source housing 620 may comprise a durable material, such as, but not limited to, a plastic, rubber, or metal. In some embodiments, the power source housing 620 may comprise an aesthetic component, such as a color, pattern, or other decorative effect. As described in FIG. 8, the power source 610 may be rechargeable and permanent, wherein the power source housing 620 may further comprise a charging port. In some aspects, the charging port may be continuously exposed or retractable. In some embodiments, the power source housing 620 may be removable and/or replaceable from the vaporizer adapter 600. In some embodiments, the power source housing 620 may be twisted in, popped in, or magnetized.

Figure 7:
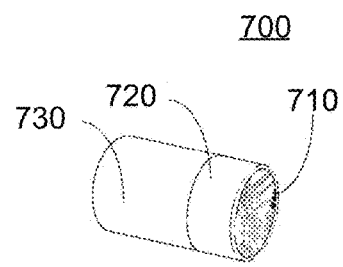
FIG. 7 illustrates a sectional view of the microcontroller housing and battery housing portion of the cigarette vaporizer and depicts the microcontroller chip.

Referring now to FIG. 7, a sectional view of an exemplary power source housing 730 and electronic housing 720 with microcontroller chip 710 of a vaporizer adapter 700 is illustrated. In some embodiments, the power source and microcontroller chip 710 may be contained in a single housing, wherein the power source may be in direct contact with the microcontroller chip 710. Similarly to the power source housing as described in FIG. 6, the electronic housing 720 may comprise a durable material, which may be heat tolerant, such as plastic, rubber, or metal. In some aspects, one or both the power source and the microcontroller chip 710 may be hermetically sealed, which may limit access and environmental damage to the components. Similar to the detachment mechanisms described in FIG. 6, the power source housing 730 may be removable either by twisting off, popping out, or through magnetism.

Figure 8:
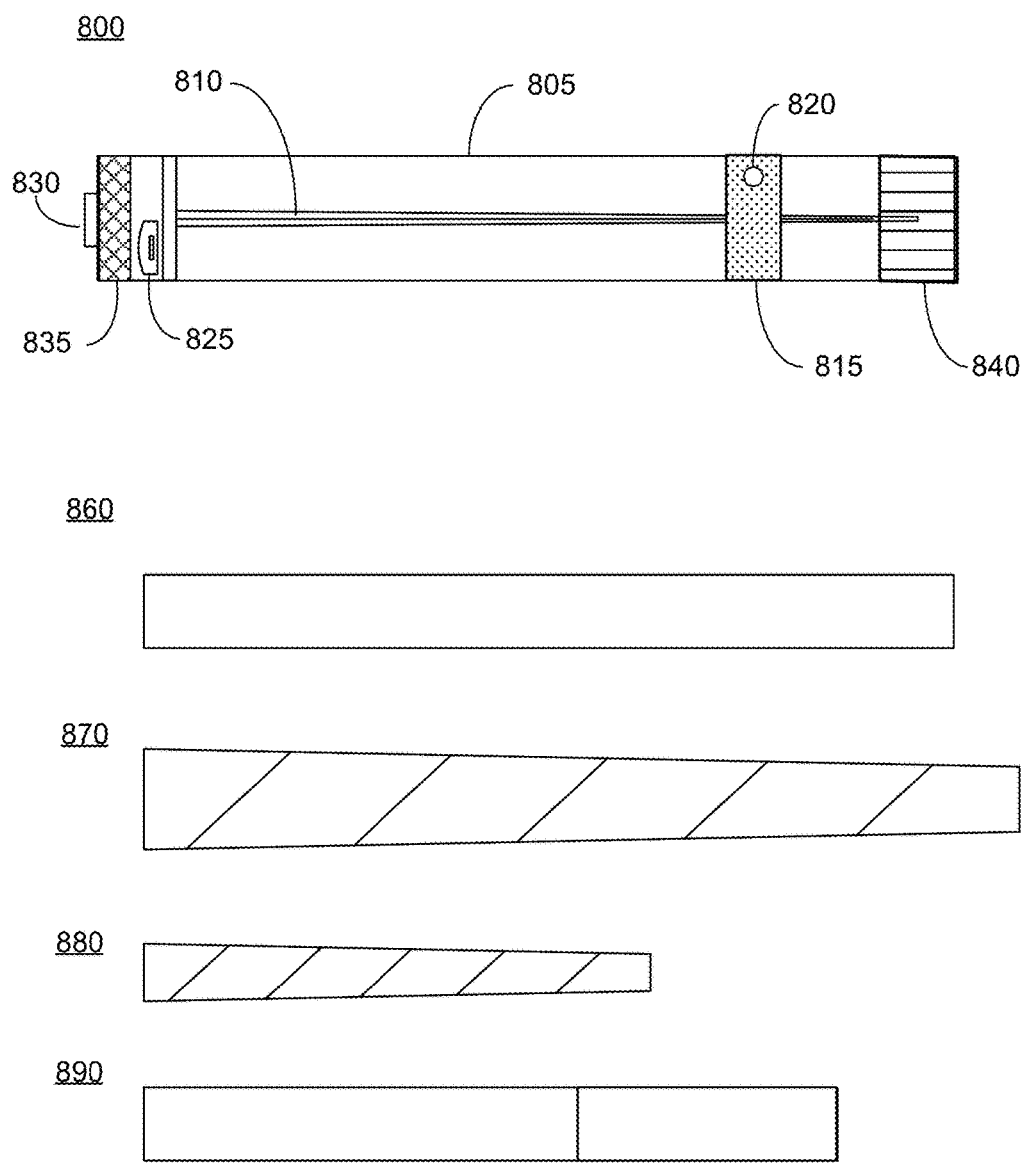
FIG. 8 illustrates an exemplary vaporizer adapter and compatible exemplary rolled articles.

Referring now to FIG. 8, an exemplary vaporizer adapter 800 is illustrated with four compatible exemplary rolled articles 860, 870, 880, 890. In some aspects, the vaporizer adapter 800 may be configured to accept a range of rolled articles 860, 870, 880, 890, such as, for example, an unfiltered cigarette 860, a cigar 870, a cone 880, or a filtered cigarette 890.

Figure 9A:
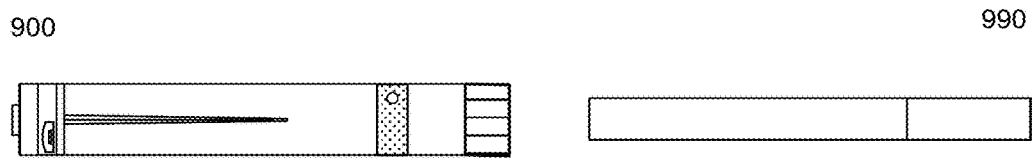
FIG. 9A illustrates an exemplary process step in using a vaporizer adapter in conjunction with a rolled article.
Figure 9B:
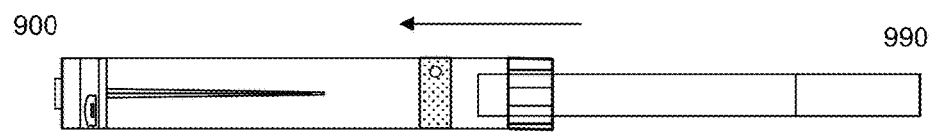
FIG. 9B illustrates an exemplary process step in using a vaporizer adapter in conjunction with a rolled article.
Figure 9C:
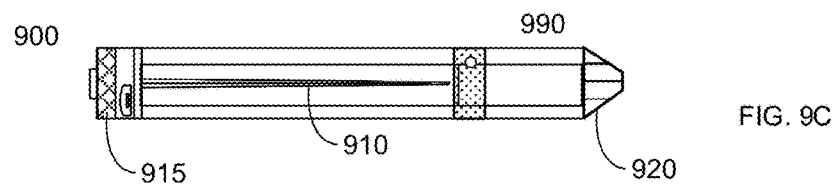
FIG. 9C illustrates an exemplary process step in using a vaporizer adapter in conjunction with a rolled article.

In some aspects, the vaporizer adapter 800 may comprise a charging port 825, which may allow for a recharging of the power source. In some aspects, the charging port 825 may comprise a mini or micro USB port, which may further allow for a transfer of data between the vaporizer adapter 800 and an external device, including, but not limited to, firmware updates, expansion of functionality, technical or troubleshooting support, and customization options. In some aspects, the power source may further comprise a light source 835, which may indicate charging or operation of the vaporizer adapter 800, such as described and illustrated in FIGS. 9C-9E below.

In some embodiments, the vaporizer adapter 800 may be able to recognize or may accept input for information related to the rolled article, including, for example, plant material, brand, or rolled article type. In some aspects, a user may be able to program vaporizer adapter 800, wherein the user may set one or more the vaporization time, the active ingredient release rate, or the vaporization temperature, as non-limiting examples.

In some embodiments, the vaporizer adapter 800 may detect the type of plant material of an inserted rolled article. The plant material of the inserted rolled article may determine the effective temperature of vaporization for the active ingredient. For example, an effective temperature range for vaporizing the active ingredients in dried cannabis may be 180° C.-230° C., whereas the effective temperature range for vaporizing active ingredients in tobacco may be 140° C.-200° C. Other plant materials and mixtures may have varying ranges of optimum vaporization. Accordingly, in some aspects, the vaporizer adapter 800 may detect types of plant material or may be programmable based on plant type. In some embodiments, the vaporizer adapter 800 may allow a user to set the temperature of the heating source 810.

In some cases, moisture levels of the plant material may affect the release of active ingredients, and in some cases, moisture levels of the vaporized active ingredients may affect the enjoyment and comfort of inhalation. Accordingly, in some embodiments, the vaporizer adapter 800 may comprise a humidifier/de-humidifier component, which may provide some control of the moisture levels within the housing element 805. For example, the humidifier/de-humidifier component may extract moisture or add moisture to one or both the area surrounding the rolled article or the plant material within the rolled article.

In some implementations, the vaporizer adapter 800 may interface with an external device, such as, for example, a smartphone, tablet, or laptop. In some aspects, the vaporizer adapter 800 may be paired with a programmable key fob or other remote controller.

In some aspects, the vaporizer adapter 800 may comprise a release guard 840, which may be adjustable based on the rolled article 860, 870, 880, 890. The release guard 840 may be a flexible rubber piece that may be rolled or folded. In some embodiments, the release guard 840 may secure the rolled article 860, 870, 880, 890 within the housing element 805. In some implementations, the release guard 840 may limit the escape of vaporized active ingredients from a containing portion of the housing element 805 before a user inhales from the vaporizer adapter 800.

In some aspects, the vaporizer adapter 800 may further comprise trigger mechanisms 815, 820, 830, which may control the heating source 810. For example, the end trigger 830 may control the power source, allowing the user to turn the system on and off. In some embodiments, the end trigger 830 may eject or release a depleted inserted rolled article. In some aspects, a finger trigger button 820 may allow a user to control the heating source 810. In some implementations, the finger trigger button 820 may allow a user to toggle through options, such as temperature, heating cycle times, or concentration of vaporized active ingredient, as non-limiting examples. In some embodiments, the end trigger 830 may include a filter (not shown) to release scents (i.e. chocolate, raspberry, etc.) through a controlled release or timed mechanism. These scents may be purchased separately by the user and installed and replaced as they desire. In some aspects, the scents may further comprise a flavor that may be integrated into the vaporized active ingredient.

In some embodiments, the vaporizer adapter 800 may further comprise a sensor trigger 815, which may sense temperature, pressure, moisture, or combinations thereof. The sensor trigger 815 may be located in positions along the vaporizer adapter 800 that may prompt an action, such as heating or vaporized active ingredient release. For example, a sensor trigger 815 may be located where a user may typically hold a rolled article, and the detection of external pressure or heat may indicate that the user is still actively using the vaporizer adapter 800, prompting the continued heating of the plant material. As another example, a sensor trigger 815 may be located where a user may place her lips when inhaling vaporized active ingredients. The detection of pressure, heat, moisture, or combinations thereof may indicate that a user is attempting to inhale vaporized active ingredients, which may prompt a surge of heat from the heating source 810.

Referring now to FIGS. 9A-9F, exemplary process steps are illustrated for use of a vaporizer adapter 900. At FIG. 9A, a user may select a rolled article 990 to use with the vaporizer adapter 900. At FIG. 9B, the rolled article 990 may be inserted into the vaporizer adapter 900. At FIG. 9C, a release guard 920 may be folded over the receiving end of the vaporizer adapter 900, wherein the release guard 920 may secure the position of the filtered cigarette 990 in the vaporizer adapter 900 and may limit escape of the inhalable active ingredient. In some aspects, an indicator light 915 may indicate the heating element 910 has effectively vaporized a portion of the active ingredient, wherein the indication may alert a user that the system is ready for inhalation.

Figure 9D:
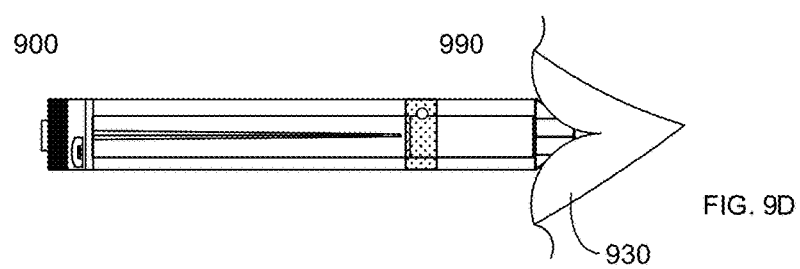
FIG. 9D illustrates an exemplary process step in using a vaporizer adapter in conjunction with a rolled article.
Figure 9E:
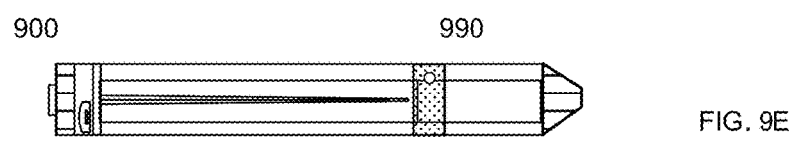
FIG. 9E illustrates an exemplary process step in using a vaporizer adapter in conjunction with a rolled article.
Figure 9F:
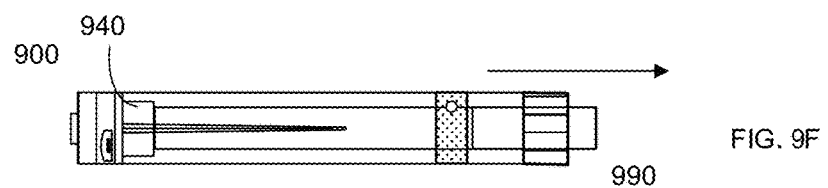
FIG. 9F illustrates an exemplary process step in using a vaporizer adapter in conjunction with a rolled article.

At FIG. 9D, a user may inhale the vaporized active ingredient. In some implementations, the release guard 920 (previously pictured in FIG. 9C) may direct the inhalable active ingredient into the mouth 930 of the user. In some embodiments, the indicator light 915 may change color to indicate the inhalation of released active ingredient. At FIG. 9E, the indicator light 915 (previously pictured in FIG. 9C) may indicate that the rolled article 990 has been effectively depleted of active ingredients. In some embodiments, a partially vaporized rolled article 990 may be stored within the vaporizer adapter 900. For example, a user may turn off the heating source 910 and leave the release guard 920 extended, which may keep the rolled article 990 secured within the housing. At FIG. 9F, the rolled article 990 may be ejected from the vaporizer adapter 900. In some aspects, the vaporizer adapter 900 may comprise an ejection mechanism 940, which may allow for easier removal of the depleted rolled article 990.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A vaporizer adapter comprising:
   a rolled article housing element comprising
      a receiving end configured to receive a rolled article comprising a plant composition, wherein a vaporization of the plant composition releases an inhalable active ingredient;
      a containing portion configured to at least partially contain inhalable active ingredients vaporized from the rolled article; and
      a releasing end, wherein the inhalable active ingredients are released; and
   a heating mechanism extending into the rolled article housing element, wherein the heating mechanism is configured to vaporize the plant composition
   a power source;
   a controller in logical communication with the power source and the heating mechanism, wherein the controller transmits operational commands to the heating mechanism;
   a trigger mechanism in logical communication with the controller, wherein the trigger mechanism is configured to receive user control inputs;
   a sensor configured to sense a predefined parameter, wherein the sensor is in logical communication with one or more the trigger mechanism, controller, or power source.

2. The vaporizer adapter of claim 1, wherein the power source is removable.

3. The vaporizer adapter of claim 1, wherein the power source is rechargeable.

4. The vaporizer adapter of claim 3, further comprising a charging port configured to receive a charging source, wherein the charging source recharges the power source when detachably connected to the charging port.

5. The vaporizer adapter of claim 4, wherein the charging port comprises a micro USB port.

6. The vaporizer adapter of claim 1, wherein the trigger mechanism is located proximate to the releasing end.

7. The vaporizer adapter of claim 1, wherein the trigger mechanism is located distally to the releasing end.

8. The vaporizer adapter of claim 1, wherein the sensor is located proximate to the releasing end.

9. The vaporizer adapter of claim 1, wherein the sensor is configured to detect a proximity of a human mouth, wherein detection prompts a predefined action related to the heating mechanism.

10. The vaporizer adapter of claim 1, wherein the vaporizer adapter is reusable.

11. The vaporizer adapter of claim 1, wherein the receiving end and the releasing end comprise the same end.

12. The vaporizer adapter of claim 1, wherein the receiving end is distal to the releasing end.

13. The vaporizer adapter of claim 1, wherein at least a portion of the heating mechanism is placed in contact with at least a portion of the plant composition of the rolled article when the rolled article is received.

14. The vaporizer adapter of claim 1, wherein the heating mechanism comprises a heating coil and a protective barrier that limits combustion of the plant composition.

15. The vaporizer adapter of claim 1, wherein the heating mechanism is configured to heat the plant composition to a predefined temperature.

16. The vaporizer adapter of claim 15, wherein the predefined temperature is variable based on a type of plant composition.

17. The vaporizer adapter of claim 1, further comprising a release guard proximate to the releasing end, wherein the release guard is configured to limit escape of the inhalable active ingredient.

* * * * *